017# United States Patent [19]

Mather

[11] Patent Number: 5,381,860
[45] Date of Patent: Jan. 17, 1995

[54] THERMAL ENERGY STORAGE SYSTEM FOR A COOL WATER AIR CONDITIONING SYSTEM

[75] Inventor: Anthony Mather, St. Petersburg Beach, Fla.

[73] Assignee: Dirrecktor TES Systems, Inc., St. Petersburg Beach, Fla.

[21] Appl. No.: 128,635

[22] Filed: Sep. 28, 1993

[51] Int. Cl.⁶ .................................. F25D 17/02
[52] U.S. Cl. .................. 165/104.19; 62/430; 62/435; 62/99; 62/118; 137/592
[58] Field of Search ............... 165/10, 104.19; 137/592; 62/430, 434, 435, 99, 118

[56] References Cited

U.S. PATENT DOCUMENTS

| | | | |
|---|---|---|---|
| 2,732,071 | 1/1956 | Crow | 137/592 |
| 4,571,948 | 2/1986 | Orenstein | 137/592 |
| 4,590,992 | 5/1986 | Tamblyn | 165/104.19 |
| 4,643,212 | 2/1987 | Rothrock | 165/104.19 |
| 5,176,161 | 1/1993 | Peters et al. | 137/592 |
| 5,197,513 | 3/1993 | Todd et al. | 137/592 |

Primary Examiner—Albert W. Davis, Jr.
Attorney, Agent, or Firm—James H. Beusse

[57] ABSTRACT

A method and apparatus for maintaining a narrow thermocline in a thermal energy liquid storage tank in a cooling system for a commercial building in which the tank provides cooling liquid, e.g., water, during a peak electricity demand period to allow the building system to reduce its electric demand during such period. The tank incorporates a water distribution system including a generally centrally positioned, vertically oriented pipe extending from a bottom of the tank to about a top of the tank. A flange is positioned about mid-way of the pipe for separating an upper section of the pipe from a lower section. A water return line is coupled to the pipe above the flange and a water extraction line is connected to the pipe below the flange. A plurality of circumferentially spaced cool water conduits are connected to the pipe generally adjacent the bottom of the tank and a plurality of circumferentially spaced warm water conduits are connected to the pipe generally adjacent the top of the tank. Each of the conduits comprises a first section radially extending from the pipe, a 90° elbow coupled to the first section and a bell-shaped diffuser coupled to the elbow. Apparatus is connected between each outlet and a tank support structure for supporting each of the upwardly turned outlets in a common horizontal plane. The support apparatus positions each of the outlets in a level plane such that water exiting the outlets flows uniformly from all edges of each outlet.

9 Claims, 2 Drawing Sheets

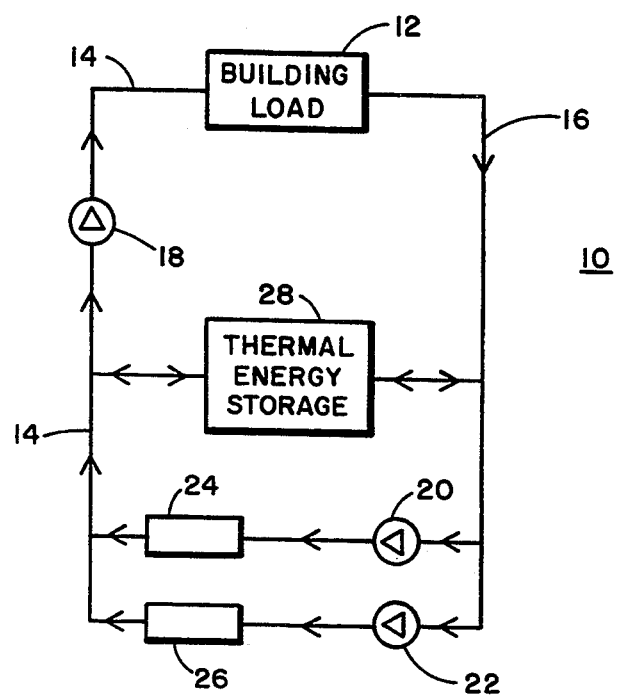
FIG. 1
(PRIOR ART)
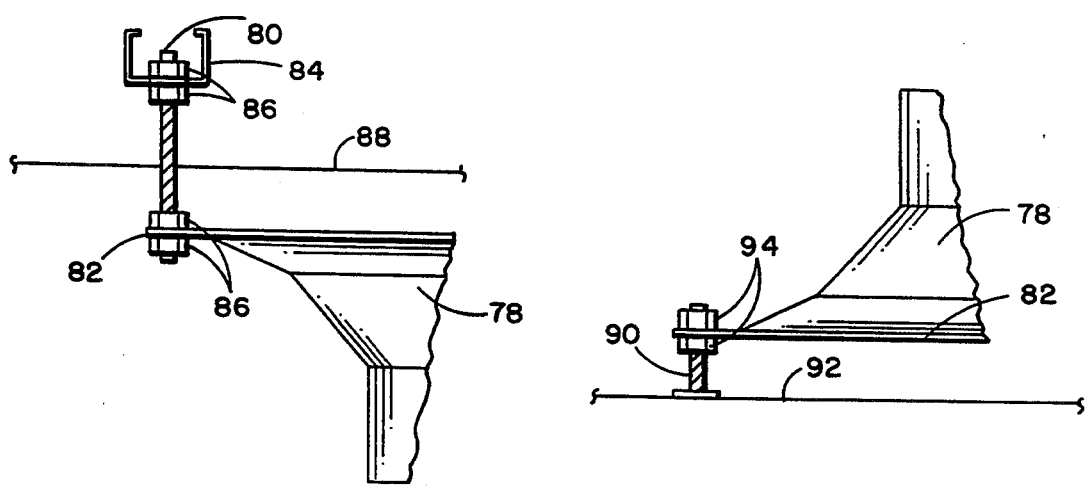
FIG. 3
FIG. 4

THERMAL ENERGY STORAGE SYSTEM FOR A COOL WATER AIR CONDITIONING SYSTEM

BACKGROUND OF THE INVENTION

The present invention relates to thermal energy storage systems using liquids and, more particularly, to a method and apparatus for establishing a relatively narrow thermocline in a cooling liquid thermal energy storage tank.

Commercial cooling systems such as are used in larger buildings typically employ a liquid, usually water, although the water may be adulterated with various chemical compounds, as a heat transfer medium. A typical cooling system 10 of this type is shown in FIG. 1. A building load, such as a heat exchanger 12, transfers heat from a building to water circulating through the heat exchanger. The water enters the heat exchanger 12 from conduit 14 at a temperature of about 42° F. Water exits the heat exchanger 12 through conduit 16 at a temperature of about 58° F. A variable speed pump 18 in conduit 14, pumps water through heat exchanger 12 at a flow rate which is adjustable to maintain the water exiting the heat exchanger at the desired temperature of 58° F. At the opposite end of the system, the water in conduit 16 is pumped by pumps 20 and 22 through corresponding ones of a pair of chillers 24,26 of a type well known in the art. The pumps 20,22 are constant flow pumps for maximum efficiency. If the rate of flow required by the building load for maintaining the exiting water temperature at 58° F. is less than the available volume from the pumps 20 and 22, the excess flow is directed into a thermal energy storage or water tank 28 which acts as a primary/secondary system decoupler, the pump 18 and building load 12 being the secondary system while the pumps 20,22 and chillers 24,26 constitute the primary system.

During the normal cooling cycle, i.e., when cool water is being produced by chillers 24,26, the excess flow is pumped into the lower portion of tank 28. Since the system has a constant flow rate, an equal volume of water is withdrawn from tank 28 and returned to conduit 16. However, the water is withdrawn from the top of tank 28. If the water within tank 28 is properly handled by the tank system, the water will stratify so that cooler water remains in the lower portion of the tank and warmer water collects in the upper portion of the tank. Preferably, the water in the upper portion of the tank is at the desired 58° F. temperature of water exiting the building load. This temperature is generally established by use of the tank 28 as the primary source of cooling water for building load 12 during a period of time when the chillers 24,26 and pumps 20,22 are taken off-line.

It will be appreciated that providing cooled water for building load 12 represents a significant energy load for an electric utility power company. As the number of such buildings has increased and placed a strain on the capacity of utility power companies, the companies have offered incentives and penalties to induce users to reduce electric power requirements, at least during peak demand hours. For cooling systems, peak demand generally runs from about noon to six p.m. During these hours, commercial users rely on cooling water stored in tank 28. The cool water (42° F.) is withdrawn from the bottom of tank 28 into conduit 14, circulated through building load 12 and returned to the top of tank 28. This cycle stores 58° F. water in the top of tank 28, which water is pulled off the top during the previously described normal cooling cycle. Although the chillers 24,26 are most efficient when converting 58° F. water to 42° F. water, they can maintain the 42° F. output flow for lower inlet water temperatures using a conventional throttling control.

Each tank 28 for a building cooling system is designed to have a volume which matches the cooling requirements of the associated building. For example, assuming that the system must operate for six hours from tank 28, the volume of the tank is selected to provide sufficient 42° F. water for the building load 12 for a six hour period. The tank 28 may be forty feet tall with a diameter of thirty-six feet. When water is stored in this tank, it is important to maintain separation between the 42° F. water and the 58° F. water. Stratification of water to achieve this result is well known. The warmer water is separated from the cooler water by a thermocline, i.e., an intermediate layer of water separating the warmer and cooler water. The thinner the thermocline, the more water that can be stored at the desired temperature. Any turbulence within the tank promotes mixing and increases the thickness of the thermocline. In some instances, the thermocline may be three or more feet thick and substantially reduce the volume of usable cooling water in the tank 28. Accordingly, it is desirable to provide a system which reduces the thermocline thickness.

SUMMARY OF THE INVENTION

Among the several objects of the present invention may be noted the provision of a method and apparatus for establishing a relatively narrow thermocline in a liquid storage tank for thermal energy storage, and the provision of a method and apparatus for maintaining a narrow thermocline in a liquid storage tank. In one form the invention is implemented in a liquid storage tank in a cooling system for a commercial building in which the tank provides cooling liquid, e.g., water, during a peak electricity demand period to allow the building system to reduce its electric demand during such period. The tank incorporates a water distribution system including a generally centrally positioned, vertically oriented pipe extending from a bottom of the tank to about a top of the tank. A flange is positioned about mid-way of the pipe for separating an upper section of the pipe from a lower section. A water return line is coupled to the pipe above the flange and a water extraction line is connected to the pipe below the flange.

A plurality of circumferentially spaced water intake conduits are connected to the pipe generally adjacent the bottom of the tank. Each of the conduits comprises a first section radially extending from the pipe, a downwardly turned elbow coupled to the first section and a bell-shaped inlet coupled to the elbow. The inlet is positioned for receiving water from immediately adjacent the tank bottom. A plurality of circumferentially spaced water return conduits are connected to the pipe generally adjacent the top of the tank. Each of the return conduits comprises a first segment radially extending from the pipe, an upwardly turned elbow connected to the first segment and a bell-shaped outlet coupled to the upwardly turned elbow. Apparatus is connected between each outlet and a tank support structure for supporting each of the upwardly turned outlets in a common horizontal plane. The support apparatus positions each of the outlets in a level plane such that water exiting the outlets flows uniformly from all edges of each outlet.

In a preferred form, the outlets and inlets are substantially identical, since their respective roles are reversed during a cycle of operation. The outlets are selected to diffuse the water return flow so that the exit flow rate approaches 0.1 feet per second. The rate may be varied but selected to reduce the flow to approximately zero velocity as the flow reaches the walls of the tank.

BRIEF DESCRIPTION OF THE DRAWINGS

For a better understanding of the present invention, reference may be had to the following detailed description taken in conjunction with the accompanying drawings in which:

FIG. 1 is a simplified diagram of a conventional cooling system for a commercial building incorporating thermal energy storage in a water tank;

FIG. 3 is a partial sectional view of a mounting arrangement of liquid diffusers adjacent a top of the storage tank of FIG. 2; and FIG. 4 is a partial sectional view of a mounting arrangement of liquid diffusers adjacent a bottom of the storage tank of FIG. 2.

DETAILED DESCRIPTION OF THE PREFERRED EMBODIMENT

Figure 2:
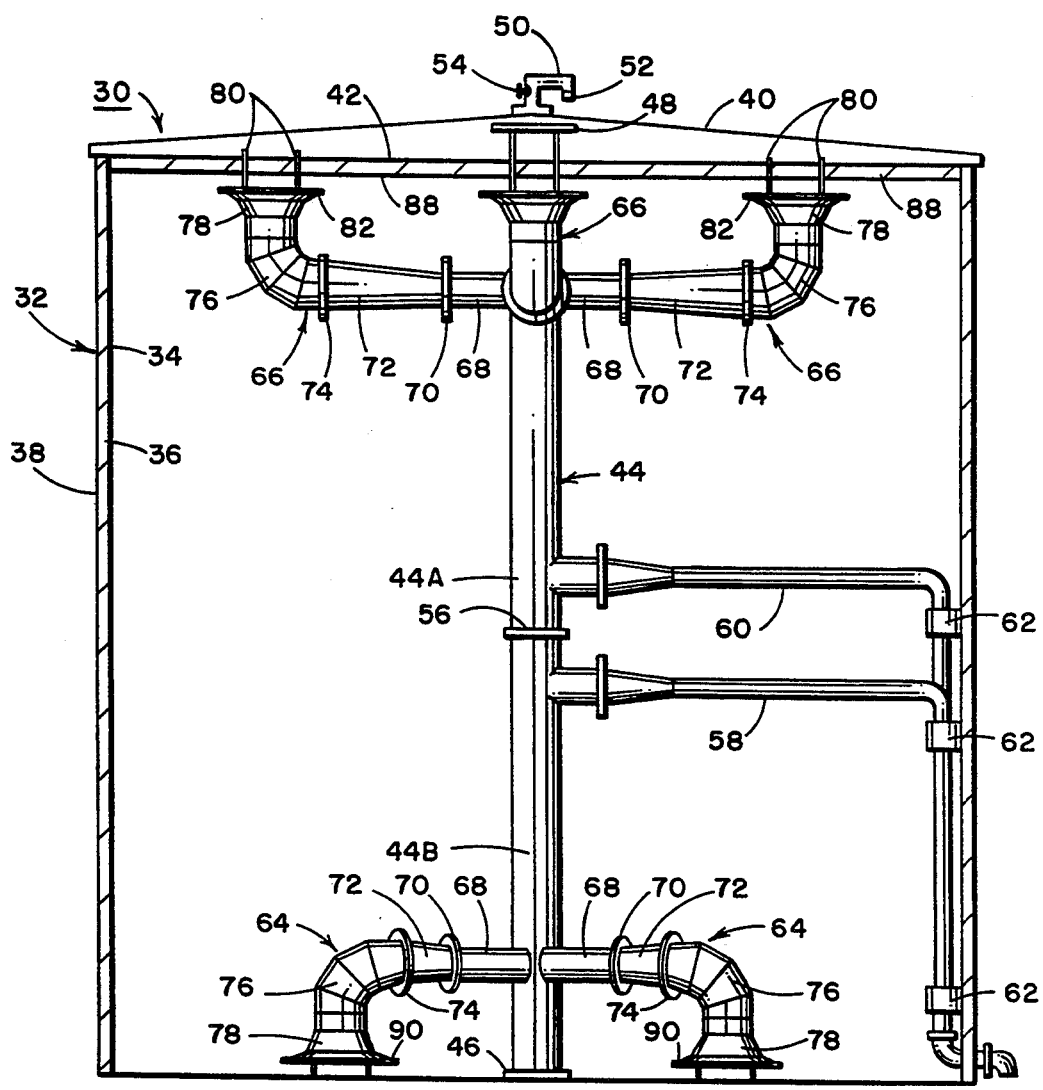
FIG. 2 is an interior elevation view of a thermal energy storage tank of the present invention.

Turning now to FIG. 2, an interior elevation view of a thermal energy liquid storage tank 30 in accordance with the present invention shows an outer tank shell 32 which may be constructed in a conventional manner with a metal circular inner shell 34 covered by an insulation layer 36 and an outer insulation sheathing 38. Tank 30 includes a dome-shaped top cover 40 and a plurality of roof joists 42. Within the tank 30 there is a central, vertically oriented liquid distribution pipe 44 having a blind flange 46 closing its lower end and providing mounting to the tank shell 34. Another flange 48 is attached to the upper end of pipe 44 and provides a central roof support for the tank. The flange 48 is open to a double angle tank vent 50, which vent 50 incorporates a one-way valve 52 allowing air to vent into the tank in case of water loss so as to prevent vacuum collapse of the tank. A manual vent 54 is also provided to allow air escape during initial filling of the tank. The pipe 44 further includes a central blind flange 56 which separates the upper portion 44A of the pipe from the lower portion 44B.

A cold water line or conduit 58 is coupled to pipe 44 below flange 56 and extends radially to the tank shell 34 before extending downward to another radial pipe section passing through tank shell 34. The line 58 is connected to an external line corresponding to line 14 of FIG. 1. A warm water line or conduit 60 is connected to pipe 44 above flange 56 and extends radially to tank shell 34 and then downward to another radial extension passing through shell 34. Line 60 is connected external of tank 30 to another line corresponding to line 16 of FIG. 1. Each of the lines 58 and 60 are attached to the tank shell 34 by conventional brackets 62.

Cold water or liquid is distributed into or extracted out of tank 30 through a plurality of circumferentially spaced ducts 64. Warm water or liquid is distributed into or extracted out of tank 30 through a plurality of circumferentially spaced ducts 66. The ducts 64 and 66 are preferably identical. For purposes of giving an illustrative example, the description of ducts 64 and 66 will assume a forty foot tall tank 30 having a diameter of thirty-six feet. For this example, pipe 44 is a 24 inch diameter stainless steel pipe. Each duct 64,66 comprises a first section 68 of 16 inch diameter stainless steel pipe of about 2.5 feet in length terminating in a connection flange 70. A second pipe section 72 is coupled to flange 70 and has an initial diameter of 16 inches at flange 70, which diameter increases to 24 inches at flange 74 over a length of about 5 feet. An elbow 76 is coupled to flange 74 turning the liquid flow through an angle of 90 degrees. For the lower, cool water ducts 64, the elbow 76 is turned downward. For the upper, warm water ducts 66, the elbow 76 is turned upward. Finally, a bell-shaped diffuser 78 is coupled to each elbow, each diffuser 78 increasing from 24 inch diameter at the junction with elbow 76 to a 48 inch diameter at its open end. The center of each diffuser 78 lies on a circle of radius 11 feet and about 7 feet from the tank wall.

Applicant has found that creating a stratified thermal energy storage system for chilled water with small temperature differences, e.g., 16° F., is difficult since the relative buoyancy of water at the two desired operating temperatures, i.e., 42° F. and 58° F., is very slight. Furthermore, the charging and discharging rates of water flow are sometimes high and can induce turbulence and liquid mixing. The problems are exacerbated by the last-in, first-out handling of water in the tank which can result in some water remaining for up to 23 hours. In addition, the building load requires precise control of water temperature. A variation of 3-4 degrees in water temperature will adversely affect building temperature and humidity.

In the illustrative design, liquid is inserted and extracted from tank 30 using a laminar flow so as to minimize turbulence and mixing and promote a narrow thermocline between the cooler and warmer liquid. The tank is charged during nighttime or early morning hours when the chillers are operating with water/liquid being inserted into the bottom of the tank through cool water line 58 and warm water being removed from the top of the tank through warm water line 60. During the discharging mode, i.e., when water/liquid from tank 30 is supplied to the building load, water is extracted through line 58 and returned to the top of the tank through line 60. The tank discharge rate is selected to provide a uniform advancement of the thermocline up or down the tank at a rate of between about 0.02 and 0.04 feet per second with the thermocline being maintained over the entire charging and discharging cycle. In applicant's system, the thermocline is typically 12 inches or less.

The position and orientation of the diffusers 78 is critical to establishing a laminar flow and a narrow thermocline. For the warm water diffusers 78 at the top of tank 30, the open ends of the diffusers are placed in a horizontal plane about 6 to 8 inches below the water surface. The open end of each diffuser 78 must be precisely level to assure a uniform flow of liquid over the outer edges of the diffuser. Liquid exiting each diffuser 78 should form a uniform annular ring having a constant flow rate in all directions. For the illustrative embodiment, a flow rate from a diffuser edge of about 0.1 feet per second has been found to provide a radial flow rate of about zero at the tank wall. A higher flow rate would cause the water to turn downward as it reached the wall and thus promote turbulence and mixing. Similarly, the flow from one diffuser 78 toward another diffuser 78 should achieve about zero velocity at its confluence with flow from the another diffuser so as to prevent a downward turning as the flows mix.

In order to establish the desired laminar flow and position the open ends of diffusers 78 precisely, applicant uses a four-point attachment of each diffuser 78 at the top of tank 30 to the tank support joists 42. Threaded support rods 80 are attached to flange 82 of each diffuser 78 and to cross-supports 84 of joists 42. Details of one such support is shown in the partial sectional view of FIG. 3. Each rod 80 has threaded fasteners 86 on each end allowing the position of the diffuser 78 with respect to the water surface 88 to be set and the position of the flange 82 (open end of diffuser 78) to be precisely level and aligned in a common horizontal plane with the other diffusers 78.

The lower diffusers 78 adjacent the tank bottom are aligned in a similar manner. Referring to FIGS. 2 and 4 together, each lower diffuser 78 uses a four-point mounting system to position the open ends of the diffuser 78 in a common horizontal plane adjacent the tank bottom. Laminar flow is assured by leveling the open end of each diffuser 78 using threaded studs 90 attached to flanges 82 of each diffuser. Each stud 90 rests on tank floor 92 and is connected to flange 82 via adjusting nuts 94. The nuts 94 are adjusted to precisely level the flanges 82 and assure a uniform annular flow of liquid from each diffuser.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A thermal energy storage system for a cool water air conditioning system comprising:
   a water storage tank;
   a water distribution system including a generally centrally positioned, vertically oriented pipe extending from a bottom of said tank to about a top of said tank, a flange positioned about midway of said pipe for separating an upper section of said pipe from a lower section thereof, a water return line coupled to said pipe above said flange and a water extraction line connected to said pipe below said flange;
   a plurality of circumferentially spaced water intake conduits connected to said pipe generally adjacent the bottom of said tank, each of said conduits comprising a first section radially extending from said pipe, a downwardly turned elbow coupled to said first section and a bell-shaped inlet coupled to said elbow, said inlet being positioned for receiving water from immediately adjacent said tank bottom;
   a plurality of circumferentially spaced water return conduits connected to said pipe generally adjacent the top of said tank, each of said return conduits comprising a first segment radially extending from said pipe, an upwardly turned elbow connected to said first segment and a bell-shaped outlet coupled to said upwardly turned elbow; and
   means for supporting each of said upwardly turned outlets in a common horizontal plane, said support means positioning each of said outlets in a level plane such that water exiting said outlets flows uniformly from all edges of each outlet.

2. The thermal energy storage system of claim 1 and including a one-way valve coupled to the top of said tank, said valve being for bleeding air into the tank when internal pressure becomes less than external pressure.

3. The thermal energy storage system of claim 1 wherein said support means comprise a plurality of threaded rods extending from each of said outlets to a top support of said tank, and a plurality of nuts threadedly engaging said rods for adjusting the position of each of said outlets.

4. The thermal energy storage system of claim 3 wherein said support means are adjusted to position each of said outlets in a plane about eight inches below a surface of water in said tank when said tank is in a normal operating state.

5. The thermal energy storage system of claim 4 wherein each of said outlets comprises a diffuser expanding from a 24 inch diameter to a 48 inch diameter within a tank having an 18 foot radius.

6. The thermal energy storage system of claim 4 wherein said water return conduits are selected to provide an outlet water flow rate of about 0.1 feet per second at an edge of each of said bell-shaped outlets.

7. A method for establishing a thermocline in a thermal energy fluid storage tank having a plurality of fluid intake lines and a plurality of fluid return lines for transferring fluid into and out of the tank, said method comprising the steps of:
   positioning open ends of the return line below a surface of the fluid;
   leveling each of the open ends in a common plane parallel to the surface of the fluid;
   diffusing the fluid within the return line to lower fluid dynamic pressure to about zero;
   flowing the fluid from the open ends of the return lines at a velocity less than a turbulent inducing velocity; and
   positioning the plurality of fluid intake lines adjacent a bottom of the tank, each of the intake lines having a bell-shaped inlet for drawing fluid thereinto at a velocity less than a turbulent inducing velocity, whereby the warmer returning fluid forms a stable layer separated from the cooler water below the return lines by a relatively thin thermocline.

8. The method of claim 7 wherein the step of flowing the fluid includes the step of reducing flow velocity at the open ends of the return lines to a rate of approximately 0.1 feet per second.

9. The method of claim 7 wherein the step of flowing the fluid includes the step of reducing flow velocity at the open ends of the return lines to a rate such that fluid velocity at side walls of the tank approaches zero.

* * * * *